(12) United States Patent
Fike et al.

(10) Patent No.: US 7,620,059 B2
(45) Date of Patent: Nov. 17, 2009

(54) METHOD AND APPARATUS FOR ACCELERATING RECEIVE-MODIFY-SEND FRAMES IN A FIBRE CHANNEL NETWORK

(75) Inventors: Melanie A Fike, Austin, TX (US); William J. Wen, Austin, TX (US)

(73) Assignee: QLOGIC, Corporation, Aliso Viejo, CA (US)

(*) Notice: Subject to any disclaimer, the term of this patent is extended or adjusted under 35 U.S.C. 154(b) by 1255 days.

(21) Appl. No.: 10/889,256

(22) Filed: Jul. 12, 2004

(65) Prior Publication Data
US 2005/0027877 A1 Feb. 3, 2005

Related U.S. Application Data

(60) Provisional application No. 60/487,876, filed on Jul. 16, 2003, provisional application No. 60/487,887, filed on Jul. 16, 2003, provisional application No. 60/487,875, filed on Jul. 16, 2003, provisional application No. 60/490,747, filed on Jul. 29, 2003, provisional application No. 60/487,667, filed on Jul. 16, 2003, provisional application No. 60/487,665, filed on Jul. 16, 2003, provisional application No. 60/492,346, filed on Aug. 4, 2003, provisional application No. 60/487,873, filed on Jul. 16, 2003.

(51) Int. Cl.
*H04L 12/28* (2006.01)
(52) U.S. Cl. .................................. 370/413; 370/428
(58) Field of Classification Search ............... 370/413, 370/428
See application file for complete search history.

(56) References Cited

U.S. PATENT DOCUMENTS 4,081,612 A   3/1978   Hafner (Continued)

FOREIGN PATENT DOCUMENTS

EP   0649098   9/1994

(Continued)

OTHER PUBLICATIONS

Malavalli, et al., "Fibre Channel Framing and Signaling (FC-FS) REV 1.10", *NCITS working draft proposed American National Standard for Information Technology*, (Jan. 25, 2001).

(Continued)

*Primary Examiner*—Melvin Marcelo
(74) *Attorney, Agent, or Firm*—Klein, O'Neill & Singh, LLP (57) ABSTRACT

A method and a fiber channel switch element for processing receive-modify-send ("RMS") frames in a fiber channel network are provided. The method includes, determining if a received frame is a RMS frame; modifying the RMS frame without copying the RMS frame to a transmit buffer; and transmitting the modified frame. The RMS frame is modified in a receive buffer before being sent to the transmit buffer and a port state machine controls the receive buffer where RMS frames are modified. The switch element includes a port having a state machine that determines if a received frame needs to be modified before being transmitted, and if the frame is to be modified then such modification occurs in a receive buffer without being copied to a transmit buffer before such modification. A buffer select logic selects the appropriate buffer for modifying and transmitting frames from.

10 Claims, 8 Drawing Sheets

U.S. PATENT DOCUMENTS

| | | |
|---|---|---|
| 4,162,375 A | 7/1979 | Schlichte ..................... 179/15 |
| 4,200,929 A | 4/1980 | Davidjuk et al. |
| 4,258,418 A | 3/1981 | Heath |
| 4,344,132 A | 8/1982 | Dixon et al. |
| 4,382,159 A | 5/1983 | Bowditch |
| 4,425,640 A | 1/1984 | Philip et al. ..................... 370/58 |
| 4,546,468 A | 10/1985 | Christmas et al. ............. 370/54 |
| 4,569,043 A | 2/1986 | Simmons et al. .............. 370/63 |
| 4,691,296 A | 9/1987 | Struger |
| 4,716,561 A | 12/1987 | Angell et al. |
| 4,725,835 A | 2/1988 | Schreiner et al. ....... 340/825.83 |
| 4,821,034 A | 4/1989 | Anderson et al. ........... 340/825 |
| 4,860,193 A | 8/1989 | Bentley et al. |
| 4,964,119 A | 10/1990 | Endo et al. |
| 4,980,857 A | 12/1990 | Walter et al. |
| 5,025,370 A | 6/1991 | Koegel et al. |
| 5,051,742 A | 9/1991 | Hullett et al. |
| 5,090,011 A | 2/1992 | Fukuta et al. |
| 5,115,430 A | 5/1992 | Hahne et al. |
| 5,144,622 A | 9/1992 | Takiyasu et al. ......... 370/85.13 |
| 5,258,751 A | 11/1993 | DeLuca et al. |
| 5,260,933 A | 11/1993 | Rouse |
| 5,260,935 A | 11/1993 | Turner |
| 5,280,483 A | 1/1994 | Kamoi et al. |
| 5,291,481 A | 3/1994 | Doshi et al. |
| 5,339,311 A | 8/1994 | Turner |
| 5,367,520 A | 11/1994 | Cordell ......................... 370/60 |
| 5,390,173 A | 2/1995 | Spinney et al. |
| 5,425,022 A | 6/1995 | Clark et al. |
| 5,537,400 A | 7/1996 | Diaz et al. |
| 5,568,165 A | 10/1996 | Kimura |
| 5,568,167 A | 10/1996 | Galbi et al. |
| 5,579,443 A | 11/1996 | Tatematsu et al. |
| 5,590,125 A | 12/1996 | Acampora et al. |
| 5,594,672 A | 1/1997 | Hicks |
| 5,598,541 A | 1/1997 | Malladi ....................... 395/286 |
| 5,610,745 A | 3/1997 | Bennett ....................... 359/139 |
| 5,623,492 A | 4/1997 | Teraslinna |
| 5,638,518 A | 6/1997 | Malladi |
| 5,666,483 A | 9/1997 | McClary |
| 5,677,909 A | 10/1997 | Heide |
| 5,687,172 A | 11/1997 | Cloonan et al. ............. 370/395 |
| 5,701,416 A | 12/1997 | Thorson et al. |
| 5,706,279 A | 1/1998 | Teraslinna |
| 5,732,206 A | 3/1998 | Mendel |
| 5,748,612 A | 5/1998 | Stoevhase et al. ........... 370/230 |
| 5,757,771 A | 5/1998 | Li et al. |
| 5,764,927 A | 6/1998 | Murphy et al. |
| 5,768,271 A | 6/1998 | Seid et al. |
| 5,768,533 A | 6/1998 | Ran |
| 5,784,358 A | 7/1998 | Smith et al. |
| 5,790,545 A | 8/1998 | Holt et al. |
| 5,790,840 A | 8/1998 | Bulka et al. |
| 5,812,525 A | 9/1998 | Teraslinna |
| 5,818,842 A | 10/1998 | Burwell et al. ............... 370/397 |
| 5,821,875 A | 10/1998 | Lee et al. |
| 5,822,300 A | 10/1998 | Johnson et al. |
| 5,825,748 A | 10/1998 | Barkey et al. |
| 5,828,475 A | 10/1998 | Bennett et al. |
| 5,835,748 A | 11/1998 | Orenstein et al. |
| 5,835,752 A | 11/1998 | Chiang et al. |
| 5,850,386 A | 12/1998 | Anderson et al. |
| 5,892,604 A | 4/1999 | Yamanaka et al. |
| 5,894,560 A | 4/1999 | Carmichael et al. |
| 5,925,119 A | 7/1999 | Maroney |
| 5,936,442 A | 8/1999 | Liu et al. |
| 5,954,796 A | 9/1999 | McCarty et al. |
| 5,974,547 A | 10/1999 | Klimenko |
| 5,978,359 A | 11/1999 | Caldara et al. |
| 5,978,379 A | 11/1999 | Chan et al. |
| 5,987,028 A | 11/1999 | Yang et al. .................... 370/380 |
| 5,999,528 A | 12/1999 | Chow et al. .................. 370/365 |
| 6,009,226 A | 12/1999 | Tsuji et al. |
| 6,011,779 A | 1/2000 | Wills |
| 6,014,383 A | 1/2000 | McCarty ...................... 370/453 |
| 6,021,128 A | 2/2000 | Hosoya et al. ............... 370/380 |
| 6,026,092 A | 2/2000 | Abu-Amara et al. |
| 6,031,842 A | 2/2000 | Trevitt et al. |
| 6,046,979 A | 4/2000 | Bauman |
| 6,047,323 A | 4/2000 | Krause ......................... 709/227 |
| 6,055,618 A | 4/2000 | Thorson |
| 6,061,360 A | 5/2000 | Miller et al. |
| 6,081,512 A | 6/2000 | Muller et al. ................ 370/256 |
| 6,108,738 A | 8/2000 | Chambers et al. |
| 6,108,778 A | 8/2000 | LaBerge |
| 6,118,776 A | 9/2000 | Berman |
| 6,118,791 A | 9/2000 | Fichou et al. |
| 6,128,292 A | 10/2000 | Kim et al. .................... 370/356 |
| 6,131,123 A | 10/2000 | Hurst et al. |
| 6,134,127 A | 10/2000 | Kirchberg |
| 6,144,668 A | 11/2000 | Bass et al. |
| 6,147,976 A | 11/2000 | Shand et al. |
| 6,148,421 A | 11/2000 | Hoese et al. |
| 6,151,644 A | 11/2000 | Wu |
| 6,158,014 A | 12/2000 | Henson |
| 6,160,813 A | 12/2000 | Banks et al. ................. 370/422 |
| 6,185,203 B1 | 2/2001 | Berman |
| 6,201,787 B1 | 3/2001 | Baldwin et al. |
| 6,209,089 B1 | 3/2001 | Selitrennikoff et al. |
| 6,229,822 B1 | 5/2001 | Chow et al. |
| 6,230,276 B1 | 5/2001 | Hayden |
| 6,240,096 B1 | 5/2001 | Book |
| 6,252,891 B1 | 6/2001 | Perches |
| 6,253,267 B1 | 6/2001 | Kim et al. |
| 6,278,708 B1 | 8/2001 | Von Hammerstein et al. |
| 6,286,011 B1 | 9/2001 | Velamuri et al. |
| 6,289,002 B1 | 9/2001 | Henson et al. |
| 6,301,612 B1 | 10/2001 | Selitrennikoff et al. |
| 6,307,857 B1 | 10/2001 | Yokoyama et al. |
| 6,308,220 B1 | 10/2001 | Mathur ........................ 709/238 |
| 6,311,204 B1 | 10/2001 | Mills |
| 6,324,181 B1 | 11/2001 | Wong et al. .................. 370/403 |
| 6,330,236 B1 | 12/2001 | Ofek et al. .................... 370/369 |
| 6,333,932 B1 | 12/2001 | Kobayasi et al. |
| 6,335,935 B2 | 1/2002 | Kadambi et al. |
| 6,343,324 B1 | 1/2002 | Hubis et al. |
| 6,353,612 B1 | 3/2002 | Zhu et al. |
| 6,370,605 B1 | 4/2002 | Chong |
| 6,397,360 B1 | 5/2002 | Bruns |
| 6,401,128 B1 | 6/2002 | Stai et al. |
| 6,404,749 B1 | 6/2002 | Falk |
| 6,411,599 B1 | 6/2002 | Blanc et al. .................. 370/219 |
| 6,411,627 B1 | 6/2002 | Hullett et al. |
| 6,418,477 B1 | 7/2002 | Verma |
| 6,421,342 B1 | 7/2002 | Schwartz et al. |
| 6,421,711 B1 | 7/2002 | Blumenau et al. |
| 6,424,658 B1 | 7/2002 | Mathur ........................ 370/429 |
| 6,438,628 B1 | 8/2002 | Messerly et al. |
| 6,449,274 B1 | 9/2002 | Holden et al. ............... 370/392 |
| 6,452,915 B1 | 9/2002 | Jorgensen |
| 6,467,008 B1 | 10/2002 | Gentry, Jr. et al. .......... 710/261 |
| 6,470,026 B1 | 10/2002 | Pearson et al. |
| 6,480,500 B1 | 11/2002 | Erimli et al. |
| 6,509,988 B1 | 1/2003 | Saito |
| 6,522,656 B1 | 2/2003 | Gridley |
| 6,532,212 B1 | 3/2003 | Soloway et al. |
| 6,553,036 B1 | 4/2003 | Miller et al. |
| 6,563,796 B1 | 5/2003 | Saito |
| 6,570,850 B1 | 5/2003 | Gutierrez et al. |
| 6,570,853 B1 | 5/2003 | Johnson et al. |
| 6,594,231 B1 | 7/2003 | Byham et al. |
| 6,597,691 B1 | 7/2003 | Anderson et al. ........... 370/360 |
| 6,597,777 B1 | 7/2003 | Ho |
| 6,606,690 B2 | 8/2003 | Padovano |

| | | | | | |
|---|---|---|---|---|---|
| 6,614,796 B1 | 9/2003 | Black et al. | 7,233,570 B2 | 6/2007 | Gregg |
| 6,622,206 B1 | 9/2003 | Kanamaru et al. | 7,233,985 B2 | 6/2007 | Hahn et al. |
| 6,629,161 B2 | 9/2003 | Matsuki et al. | 7,239,641 B1 | 7/2007 | Banks et al. |
| 6,643,298 B1 | 11/2003 | Brunheroto et al. | 7,245,613 B1 | 7/2007 | Winkles et al. |
| 6,657,962 B1 | 12/2003 | Barri et al. | 7,245,627 B2 | 7/2007 | Goldenberg et al. |
| 6,684,209 B1 | 1/2004 | Ito et al. | 7,248,580 B2 | 7/2007 | George et al. |
| 6,697,359 B1 | 2/2004 | George ................ 370/357 | 7,263,593 B2 | 8/2007 | Honda et al. |
| 6,697,368 B2 | 2/2004 | Chang et al. | 7,266,286 B2 | 9/2007 | Tanizawa et al. |
| 6,697,914 B1 | 2/2004 | Hospodor et al. | 7,269,131 B2 | 9/2007 | Cashman et al. |
| 6,718,497 B1 | 4/2004 | Whitby-Strevens | 7,269,168 B2 | 9/2007 | Roy et al. |
| 6,738,381 B1 | 5/2004 | Agnevik et al. | 7,277,431 B2 | 10/2007 | Walter et al. |
| 6,744,772 B1 | 6/2004 | Eneboe et al. | 7,287,063 B2 | 10/2007 | Baldwin et al. |
| 6,760,302 B1 | 7/2004 | Ellinas et al. | 7,292,593 B1 | 11/2007 | Winkles et al. |
| 6,765,871 B1 | 7/2004 | Knobel et al. | 7,315,511 B2 | 1/2008 | Morita et al. |
| 6,779,083 B2 | 8/2004 | Ito et al. | 7,327,680 B1 | 2/2008 | Kloth |
| 6,785,241 B1 | 8/2004 | Lu et al. | 7,346,707 B1 | 3/2008 | Erimli |
| 6,807,181 B1 | 10/2004 | Weschler | 7,352,740 B2 | 4/2008 | Hammons et al. |
| 6,816,492 B1 | 11/2004 | Turner et al. | 7,397,788 B2 | 7/2008 | Mies et al. |
| 6,816,750 B1 | 11/2004 | Klaas | 7,406,034 B1 | 7/2008 | Cometto et al. |
| 6,859,435 B1 | 2/2005 | Lee et al. | 7,424,533 B1 | 9/2008 | Di Benedetto et al. |
| 6,865,155 B1 | 3/2005 | Wong et al. | 7,443,794 B2 | 10/2008 | George et al. |
| 6,865,157 B1 | 3/2005 | Scott et al. | 7,460,534 B1 | 12/2008 | Ballenger |
| 6,886,141 B1 | 4/2005 | Kunz et al. | 7,466,700 B2 | 12/2008 | Dropps et al. |
| 6,888,831 B1 | 5/2005 | Hospodor et al. | 7,471,691 B2 | 12/2008 | Black et al. |
| 6,901,072 B1 | 5/2005 | Wong | 2001/0011357 A1 | 8/2001 | Mori |
| 6,904,507 B2 | 6/2005 | Gil | 2001/0022823 A1 | 9/2001 | Renaud |
| 6,922,408 B2 | 7/2005 | Bloch et al. | 2001/0033552 A1 | 10/2001 | Barrack et al. |
| 6,928,470 B1 | 8/2005 | Hamlin | 2001/0038628 A1 | 11/2001 | Ofek et al. .................. 370/392 |
| 6,934,799 B2 | 8/2005 | Acharya et al. | 2001/0043564 A1 | 11/2001 | Bloch et al. |
| 6,941,357 B2 | 9/2005 | Nguyen et al. | 2001/0047460 A1 | 11/2001 | Kobayashi et al. |
| 6,941,482 B2 | 9/2005 | Strong | 2002/0016838 A1 | 2/2002 | Geluc et al. |
| 6,947,393 B2 | 9/2005 | Hooper, III | 2002/0034178 A1 | 3/2002 | Schmidt et al. |
| 6,952,659 B2 | 10/2005 | King et al. | 2002/0071387 A1 | 6/2002 | Horiguchi et al. |
| 6,968,463 B2 | 11/2005 | Pherson et al. | 2002/0103913 A1 | 8/2002 | Tawil et al. |
| 6,975,627 B1 | 12/2005 | Parry et al. | 2002/0104039 A1 | 8/2002 | DeRolf et al. |
| 6,983,342 B2 | 1/2006 | Helenic et al. | 2002/0118692 A1 | 8/2002 | Oberman et al. |
| 6,987,768 B1 | 1/2006 | Kojima et al. | 2002/0122428 A1 | 9/2002 | Fan et al. |
| 6,988,130 B2 | 1/2006 | Blumenau et al. | 2002/0124102 A1 | 9/2002 | Kramer et al. |
| 6,988,149 B2 | 1/2006 | Odenwald | 2002/0124124 A1 | 9/2002 | Matsumoto et al. |
| 7,000,025 B1 | 2/2006 | Wilson | 2002/0147560 A1 | 10/2002 | Devins et al. |
| 7,002,926 B1 | 2/2006 | Eneboe et al. | 2002/0147843 A1 | 10/2002 | Rao |
| 7,010,607 B1 | 3/2006 | Bunton | 2002/0156918 A1 | 10/2002 | Valdevit et al. |
| 7,024,410 B2 | 4/2006 | Ito et al. | 2002/0159385 A1 | 10/2002 | Susnow et al. |
| 7,031,615 B2 | 4/2006 | Gentile | 2002/0172195 A1 | 11/2002 | Pekkala et al. |
| 7,039,070 B2 | 5/2006 | Kawakatsu | 2002/0174197 A1 | 11/2002 | Schimke et al. |
| 7,039,870 B2 | 5/2006 | Takaoka et al. | 2002/0191602 A1 | 12/2002 | Woodring et al. |
| 7,047,326 B1 | 5/2006 | Crosbie et al. | 2002/0194294 A1 | 12/2002 | Blumenau et al. |
| 7,050,392 B2 | 5/2006 | Valdevit | 2002/0196773 A1 | 12/2002 | Berman |
| 7,051,182 B2 | 5/2006 | Blumenau et al. | 2003/0002503 A1 | 1/2003 | Brewer et al. |
| 7,055,068 B2 | 5/2006 | Riedl | 2003/0002516 A1 | 1/2003 | Boock et al. |
| 7,061,862 B2 | 6/2006 | Horiguchi et al. | 2003/0016683 A1 | 1/2003 | George et al. |
| 7,061,871 B2 | 6/2006 | Sheldon et al. | 2003/0021239 A1 | 1/2003 | Mullendore et al. |
| 7,076,569 B1 | 7/2006 | Bailey et al. | 2003/0026267 A1 | 2/2003 | Oberman et al. |
| 7,082,126 B2 | 7/2006 | Ain et al. | 2003/0026287 A1 | 2/2003 | Mullendore et al. |
| 7,092,374 B1 | 8/2006 | Gubbi | 2003/0033487 A1 | 2/2003 | Pfister et al. |
| 7,110,394 B1 | 9/2006 | Chamdani et al. | 2003/0035433 A1 | 2/2003 | Craddock et al. |
| 7,120,728 B2 | 10/2006 | Krakirian et al. | 2003/0046396 A1 | 3/2003 | Richter et al. |
| 7,123,306 B1 | 10/2006 | Goto et al. | 2003/0056000 A1 | 3/2003 | Mullendore et al. |
| 7,124,169 B2 | 10/2006 | Shimozono et al. | 2003/0063567 A1 | 4/2003 | Dehart |
| 7,150,021 B1 | 12/2006 | Vajjhala et al. | 2003/0072316 A1 | 4/2003 | Niu et al. |
| 7,151,778 B2 | 12/2006 | Zhu et al. | 2003/0076788 A1 | 4/2003 | Grabauskas et al. |
| 7,171,050 B2 | 1/2007 | Kim | 2003/0079019 A1 | 4/2003 | Lolayekar et al. |
| 7,185,062 B2 | 2/2007 | Lolayekar et al. | 2003/0084219 A1 | 5/2003 | Yao et al. |
| 7,187,688 B2 | 3/2007 | Garmire et al. | 2003/0086377 A1 | 5/2003 | Berman |
| 7,188,364 B2 | 3/2007 | Volpano | 2003/0091062 A1 | 5/2003 | Lay et al. |
| 7,190,667 B2 | 3/2007 | Susnow et al. | 2003/0093607 A1 | 5/2003 | Main et al. |
| 7,194,538 B1 | 3/2007 | Rabe et al. | 2003/0103451 A1 | 6/2003 | Lutgen et al. |
| 7,200,108 B2 | 4/2007 | Beer et al. | 2003/0112819 A1 | 6/2003 | Kofoed et al. |
| 7,200,610 B1 | 4/2007 | Prawdiuk et al. | 2003/0115355 A1 | 6/2003 | Cometto et al. |
| 7,209,478 B2 | 4/2007 | Rojas et al. | 2003/0117961 A1 | 6/2003 | Chuah et al. |
| 7,215,680 B2 | 5/2007 | Mullendore et al. | 2003/0118053 A1 | 6/2003 | Edsall et al. |
| 7,221,650 B1 | 5/2007 | Cooper et al. | 2003/0120743 A1 | 6/2003 | Coatney et al. |
| 7,230,929 B2 | 6/2007 | Betker et al. | 2003/0120791 A1 | 6/2003 | Weber et al. |

| | | |
|---|---|---|
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0024831 A1 | 2/2004 | Yang et al. |
| 2004/0027989 A1 | 2/2004 | Martin et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ....................... 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153863 A1 | 8/2004 | Klotz et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey et al. |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Office Action from USPTO dated Mar. 5, 2008 for U.S. Appl. No. 10/889,259".

"Office Action from USPTO dated Mar. 7, 2008 for U.S. Appl. No. 10/894,629".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".

"Final Office Action from USPTO dated May 21, 2008 for U.S. Appl. No. 10/889,635".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Final Office Action from USPTO dated Aug. 20, 2008 for U.S. Appl. No. 10/798,468".

"Office Action from USPTO dated Sep. 18, 2008 for U.S. Appl. No. 10/894,978".

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.

Claudio DeSanti, "Virtual Fabrics Switch Support" ; VF Switch Support, T11/04-395v2. Sep. 2004, pp. 1-15.
Pelissier et al, "Inter-Fabric Routing" , dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture" , Presentation by Brocade to T11/03-369V0 dated Jun. 2, 2003.
Brown, Douglas W., "A State-Machine Synthesizer", *18th Design Automation Conference*, (1981),301-305.
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Deliver Server-Free Backup", *Pathlight & Computer Associates*, White Paper of Apr. 2000, Ithaca, New York, XP-002381153,1-8.
Naik, D. , "Inside Windows Storage:Server Storage Technologies for Windows 2000, Windows Server 2003 and Beyond", *Addison-Wesley*, US, Chapter 5, XP-002381152, (Jul. 15, 2003),137-173.
"Office Action from USPTO dated Jun. 27, 2008 for U.S. Appl. No. 10/894,726".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Mar. 20, 2008 for U.S. Appl. No. 10/894,732".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".

"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Examination Report from the European Patent Office dated Oct. 12, 2007 for European Application No. 05 805 632.6".
Banks, David C., et al., "Link Trunking and Measuring Link Latency in Fibre Channel Fabric", Provisional U.S. Appl. No. 60/286,046, 1-52.
"Office Action from USPTO dated Sep. 23, 2008 for U.S. Appl. No. 12/031,585".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Apr. 1, 2008 for U.S. Appl. No. 10/956,717".
Banks, David C., et al., "Link Trunking and Measuring Link Latency in Fibre Channel Fabric", Provisional U.S. Appl. No. 60/286,046, 1-52, filed Apr. 23, 2001.
Curtis, A. R., "Design Considerations for 10-Gbit Fibre Channel", *Curtis A. Ridgeway, Distinguished I/O Architect, Storage and Computing Asic's Division, LSI Logic Corp.*, Apr. 14, 2003.
Malavalli, Kumar, "High Speed Fibre Channel Switching Fabric Devices", *Proceedings of the SPIE, SPIE*, Bellingham, VA, USA vol. 1577., XP000562869, ISSN: 0277-786X,(Sep. 4, 1991),216-226.
Melhem, et al., "Minimizing Wavelength Conversions in WDM Path Establishment", *Computer Science Department, University of Pittsburgh*, Pittsburgh, PA 15260, (2001),197-211.
Ridgeway, Curt, "0GFC-40GFC using 4-lane XAUI's", *LSI Logic Presentation*—T11/03-069v0, Feb. 3, 2003.

METHOD AND APPARATUS FOR ACCELERATING RECEIVE-MODIFY-SEND FRAMES IN A FIBRE CHANNEL NETWORK

CROSS-REFERENCE TO RELATED APPLICATIONS

This application claims priority under 35 USC Section 119(e), to the following provisional patent applications:
Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

The disclosures of the foregoing applications are incorporated herein by reference in their entirety.

BACKGROUND

1. Field of the Invention

The present invention relates to networks, and more particularly, to accelerating receive-modify-send frames in a fibre channel network.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

Traditional fibre channel port implementations maintain frame buffers for transmit-side separate from the receive-side. This separation prevents contention during full-duplex operations, but induces unnecessary firmware overhead for "Receive-Modify-Send" fibre channel frames.

Figure 2A:
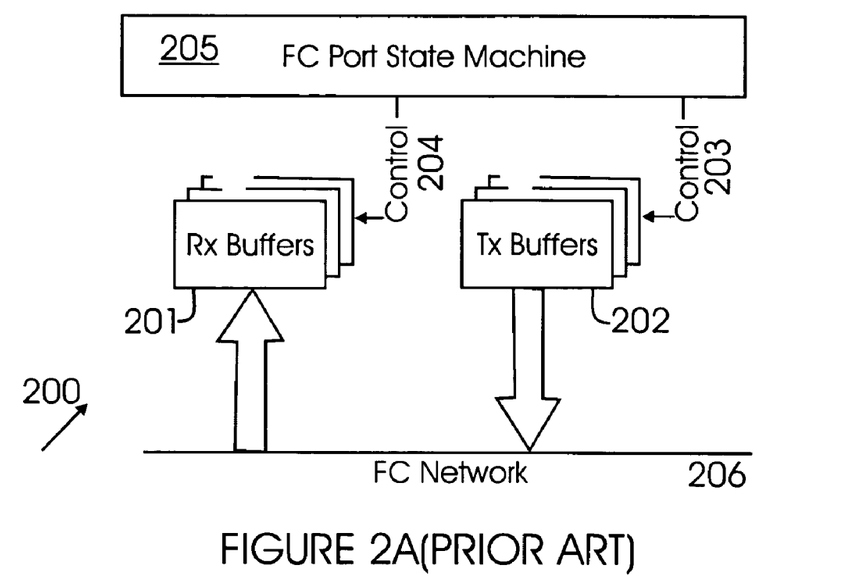
FIGS. 2A-2D show prior art configurations for processing frames.

FIG. 2A shows a conventional implementation of receive and transmit buffers in a fibre channel port 200 coupled to fibre channel network 206. A Receive ("Rx") Buffer 201 may be in use at the same time as a Transmit ("Tx") Buffer 202 if FC Port 200 supports full-duplex data transfers. Separating the buffers for receive-side from transmit-side prevents contentions and/or race conditions. FC Port State Machine 205 implements the state machine requirements as per the Fibre Channel standard using control information 203 and 204. For example, the FC Port State Machine 205 in an Arbitrated Loop environment would implement the Loop Port State Machine (LPSM), as per the FC-AL standard.

Figure 2B:
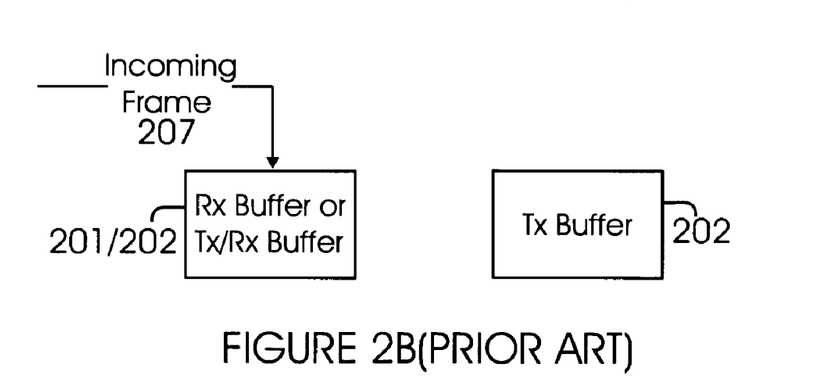
Figure 2C:
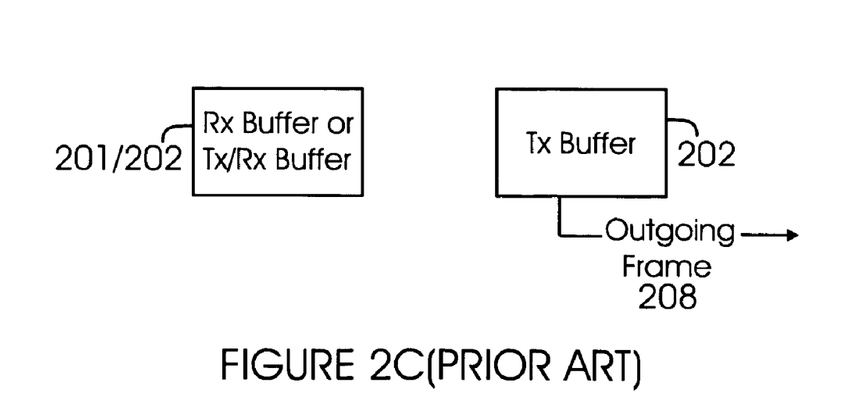

FIG. 2B shows incoming frames 207 that are received in buffer 201/202. FIG. 2C shows outgoing frame(s) 208 from transmit buffer 202.

Figure 2D:
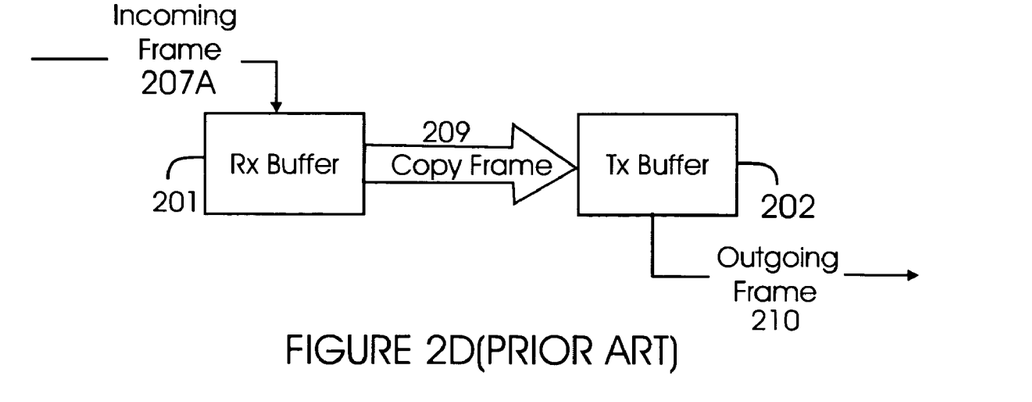

FIG. 2D shows the process flow for frames that are received and then modified before transmission ("Receive-Modify-Send" frames also referred to as "RMS frames"). Frame 207A is an RMS frame that is received by the Rx buffer 201. Firmware detects if an RMS frame is received. Thereafter, the frame is copied (209) to Tx buffer 202. The frame is modified in the Tx buffer 202 and then sent out as frame 210.

The conventional techniques are cumbersome and slow because RMS frames have to be copied first and then modified in the Tx buffer. This requires extra firmware operation and slows the overall system.

Therefore, there is a need for a method and system to efficiently process RMS frames in FC networks.

SUMMARY OF THE INVENTION

In one aspect of the present invention, a method for processing receive-modify-send ("RMS") frames in a fibre channel network is provided. The method includes, determining if a received frame is a RMS frame; modifying the RMS frame without copying the RMS frame to a transmit buffer; and transmitting the modified frame. The RMS frame is modified in a receive buffer before being sent to the transmit buffer and a port state machine controls the receive buffer where RMS frames are modified.

In another aspect of the present invention, a fibre channel switch element coupled to an arbitrated loop in a network is provided. The switch element includes a port having a state machine that determines if a received frame needs to be modified before being transmitted, and if the frame is to be modified then such modification occurs in a receive buffer without being copied to a transmit buffer before such modification. A buffer select logic selects the appropriate buffer for modifying and transmitting frames from.

In yet another aspect of the present invention, a fibre channel network is provided. The network includes, a fibre channel switch element including a port having a state machine that determines if a received frame needs to be modified before being transmitted, and if the frame is to be modified then such modification occurs in a receive buffer without being copied to a transmit buffer before such modification.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"AL_PA": Arbitrated loop physical address.

"FC-AL": Fibre channel arbitrated loop process described in FC-AL standard incorporated herein by reference in its entirety.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"LIP": Loop initialization primitive.

"L_Port": A port that contains Arbitrated Loop functions associated with the Arbitrated Loop topology.

"RMS" frames: Receive-Modify-Send frames

"SES": SCSI Enclosure Services.

To facilitate an understanding of the preferred embodiment, the general architecture and operation of a fibre channel system will be described. The specific architecture and operation of the preferred embodiment will then be described with reference to the general architecture of the fibre channel system.

Figure 1:
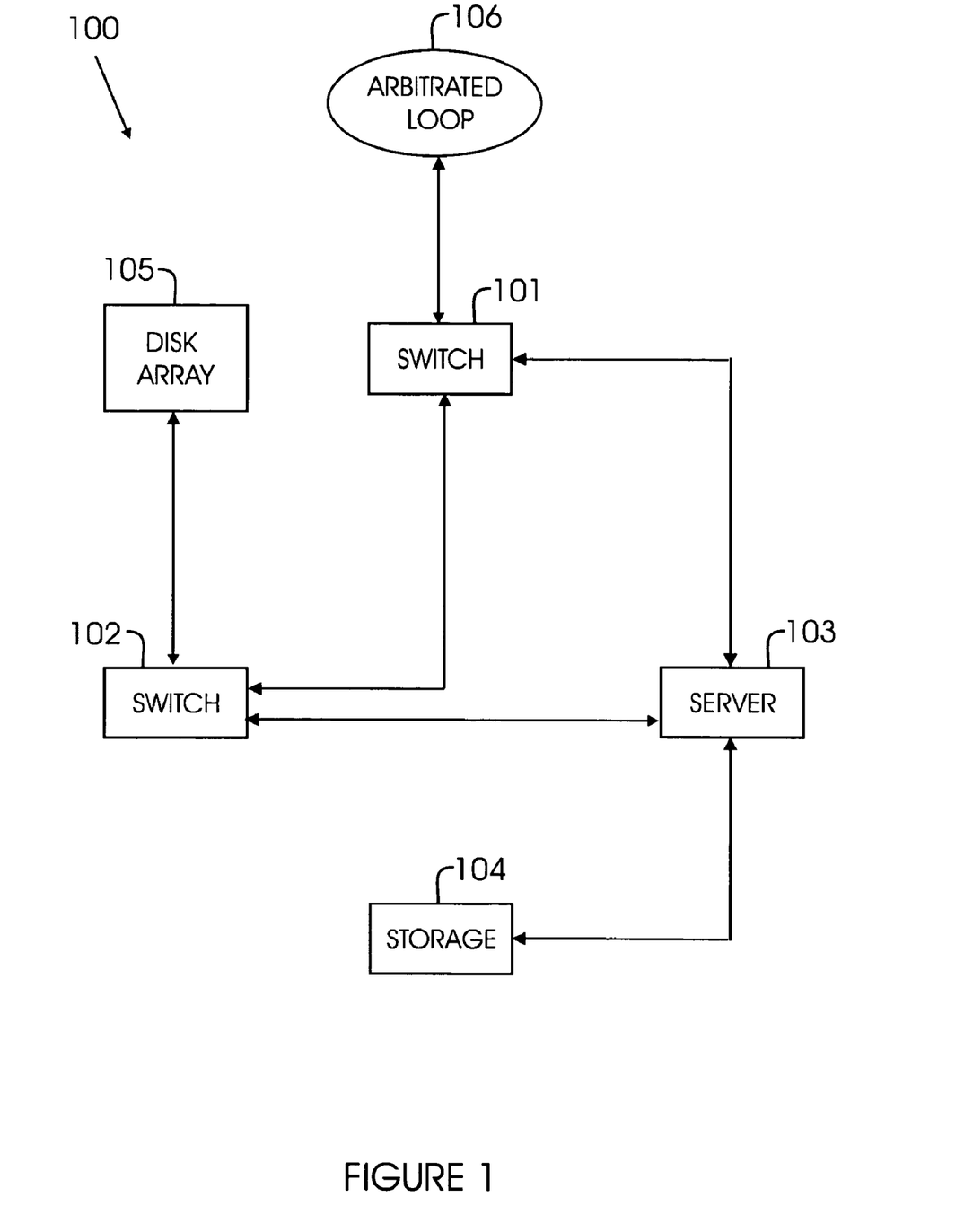
FIG. 1 shows a block diagram of a storage area network.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 4:
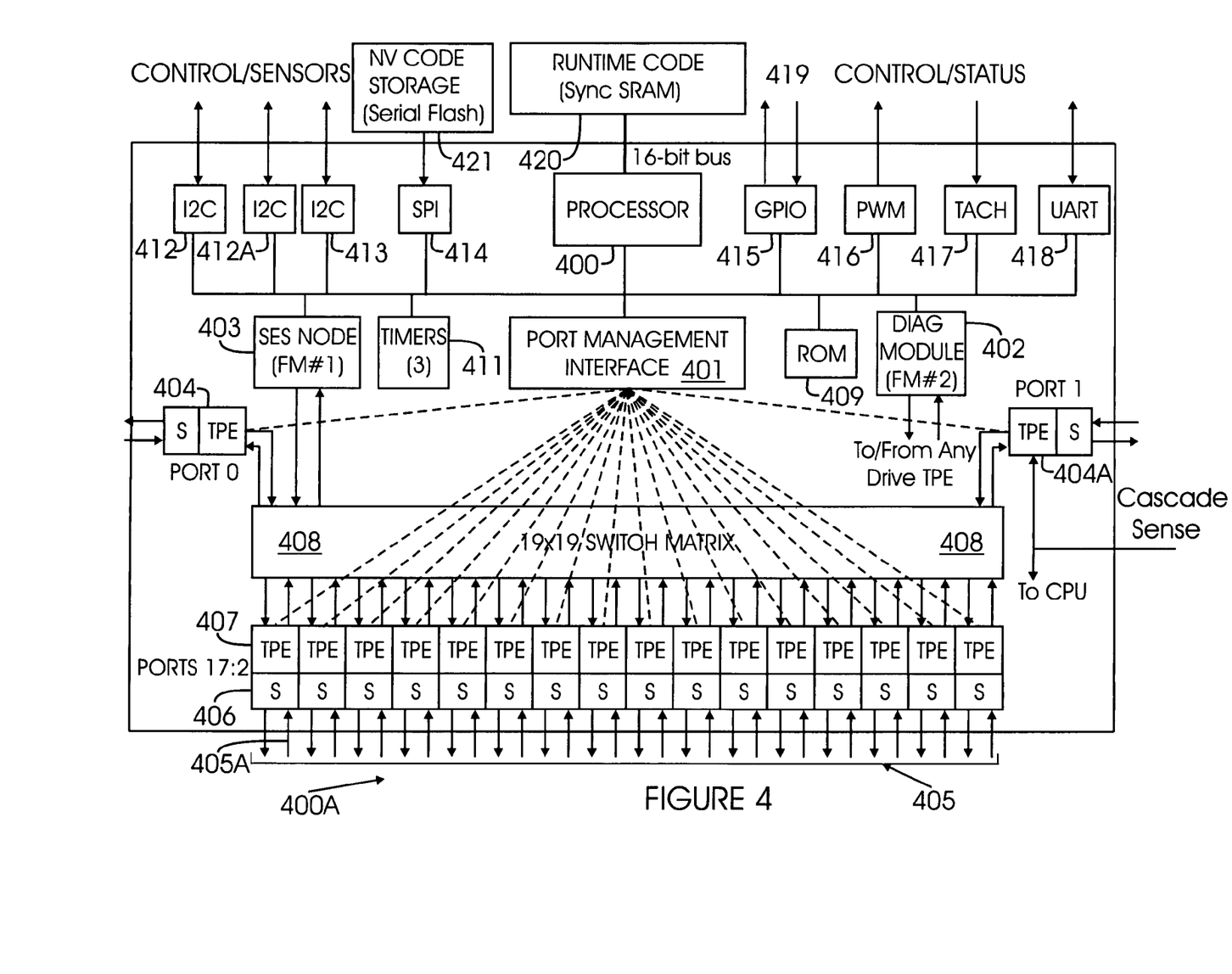
FIG. 4 shows a block diagram of a switch element, according to one aspect of the present invention.

FIG. 4 is a block diagram of an 18-port ASIC FC element 400A (also referred to as system 400A) according to one aspect of the present invention. FC element 400A provides various functionality in an FC-AL environment, including without limitation, FC element 400A operates as a loop controller and loop switch using switch matrix 408, in accordance with the FC-AL standard.

FC element 400A of the present invention is presently implemented as a single CMOS ASIC, and for this reason the term "FC element" and ASIC are used interchangeably to refer to the preferred embodiments in this specification. Although FIG. 4 shows 18 ports, the present invention is not limited to any particular number of ports.

System 400A provides a set of port control functions, status indications, and statistics counters for monitoring the health of the loop and attached devices, diagnosing faults, and recovering from errors.

ASIC 400A has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 400A in FIG. 4. However, the ports may be located on any side of ASIC 400A. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Switch matrix 408 provides a quasi-direct architecture in the form of a buffer-less Switch Matrix. Switch matrix 408 includes data multiplexers that provide a path to each port.

SGA 408 creates a direct loop connection between source and destination devices. This connection methodology avoids the delay associated with data having to pass from one disk drive member of the loop to the next until the data has completed traversing the loop.

System 400A includes plural I2C (I2C standard compliant) interfaces 412-413 that allow system 400A to couple to plural I2C ports each having a master and slave capability. Timer module 411 is used to monitor various timers (not shown) used by System 400A.

System 400A also includes a general-purpose input/output interface ("GPIO") 415. This allows information from system 400A to be analyzed by any device that can use GPIO 415. Control/Status information 419 can be sent or received through module 415.

System 400A also includes a SPI module 414 that is used for parallel to serial and serial to parallel transfer between processor 400 firmware and flash memory 421 in the standard Little Endian format.

System 400A also includes a Universal Asynchronous Receiver/Transmitter ("UART") interface 418 that converts serial data to parallel data (for example, from a peripheral device modem or data set) and vice-versa (data received from processor 400) complying industry standard requirements.

System 400A can also process tachometer inputs (received from a fan, not shown) using module 417. Processor 400 can read the tachometer input via a tachometer rate register and status register (not shown).

System 400A provides pulse width modulator ("PWM") outputs via module 416. Processor 400 can program plural outputs.

System 400A also includes two frame manager modules 402 and 403 that are similar in structure. Processor 400 can set both modules 402 and 403 into a data capture mode by using a control bit. Processor 400 can access runtime code from memory 420 and input/output instructions from read only memory 409.

Figure 5A:
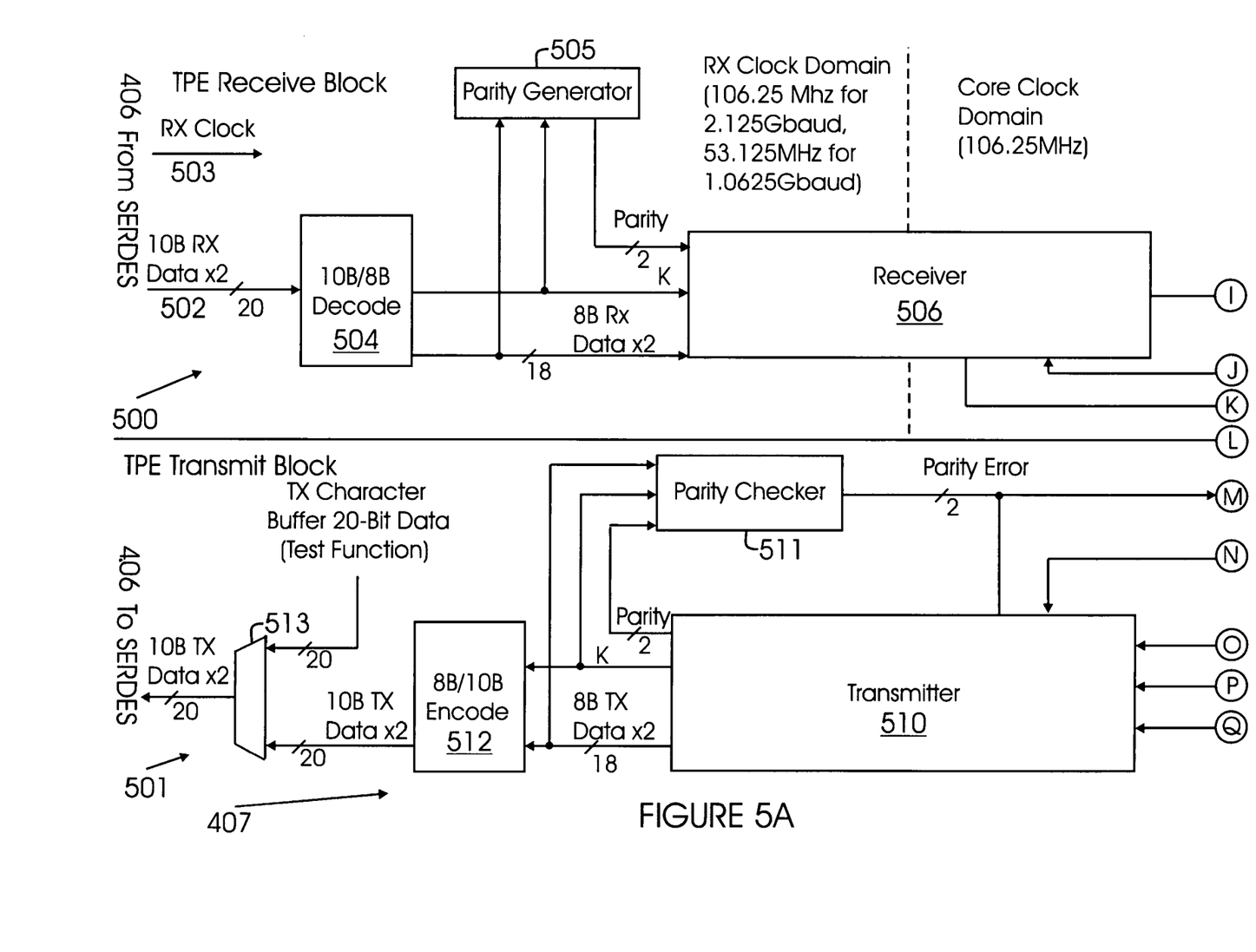
FIG. 5A and 5B (jointly referred to as FIG. 5) show a block diagram of a transmission protocol engine, according to one aspect of the present invention.
Figure 5B:
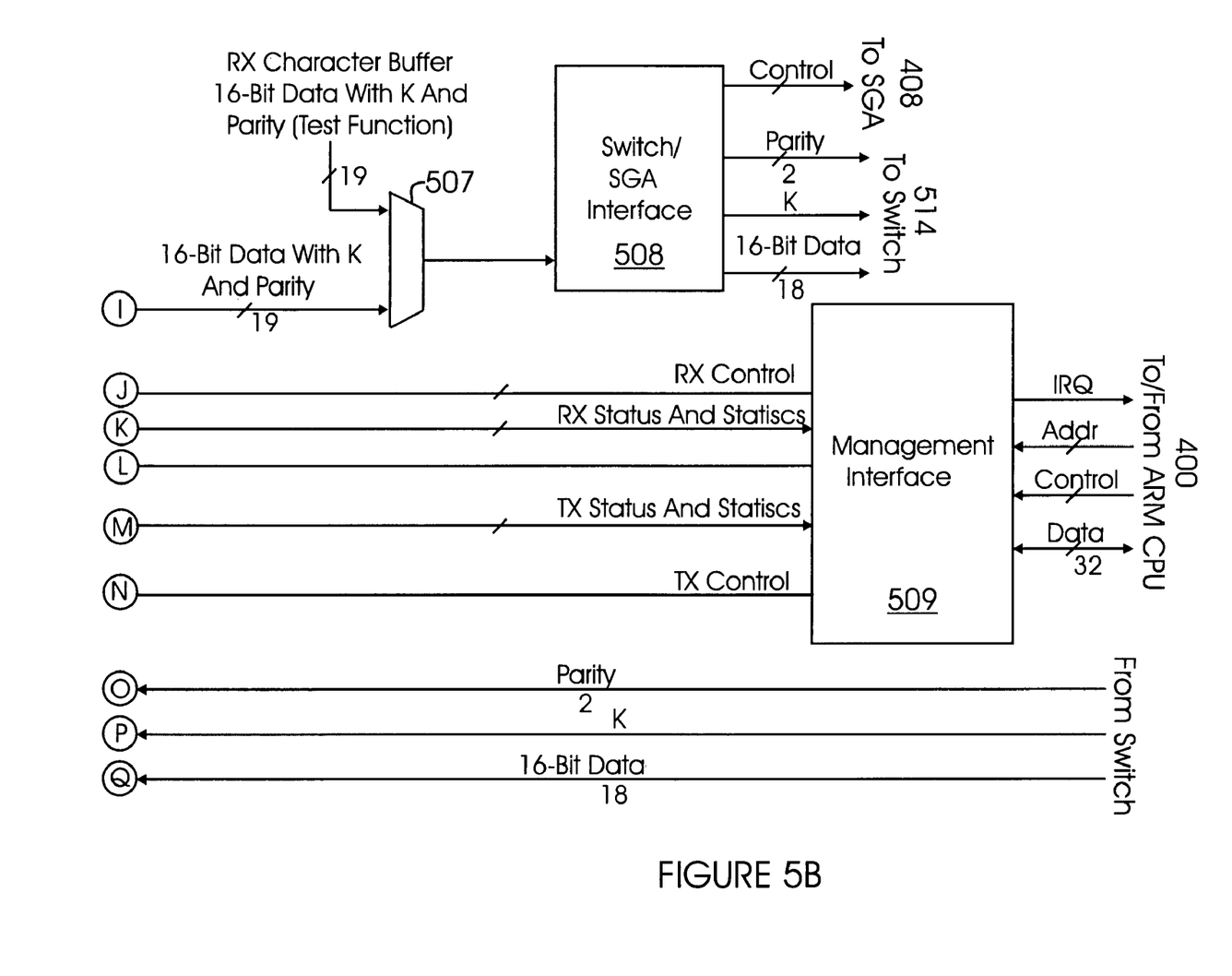

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Module 402 (also referred to as the "diag module 402") is a diagnostic module used to transfer diagnostic information between a FC-AL and the firmware of system 400A.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintains the current fill word.

Figure 6A:
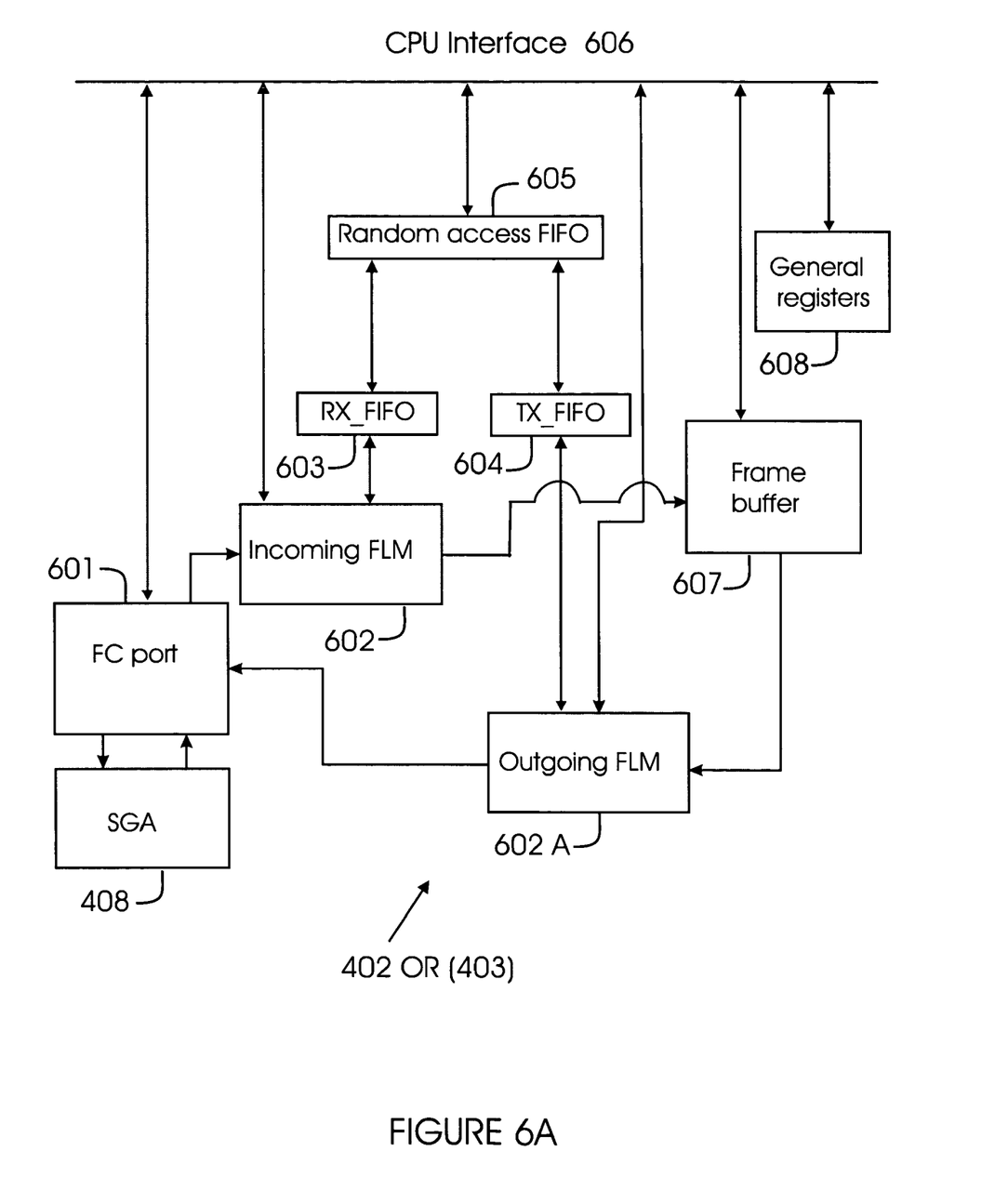
FIGS. 6A and 6B show block diagrams for a diagnostic module and a SES module, according to one aspect of the present invention.
Figure 6B:
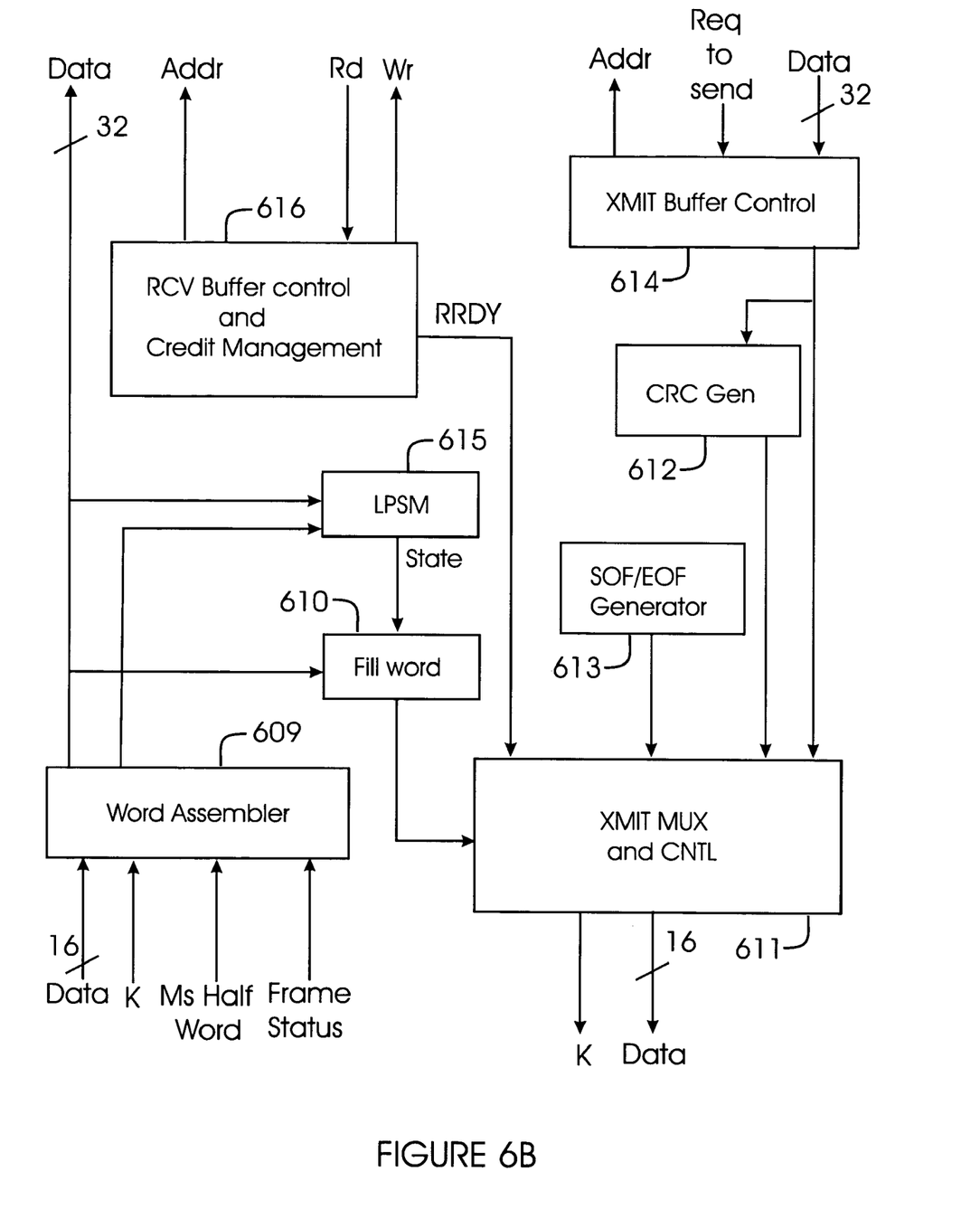

Based on a current LPSM 615 state (OPEN or OPENED State), modules 402 and 403 receive frames, pass the frame onto a buffer, and alert firmware that a frame has been received. Module 402 and 403 follow FC-AL buffer to buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

FIGS. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle, RX_FIFO ("FIFO") 603 and TX_FIFO transmit side FIFO 604 interfacing with FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. On request, modules 402 and 403 may automatically generate SOF and EOF during frame transmission (using module 613). On request, modules 402 and 403 may also automatically calculate the Cyclic Redundancy Code (CRC) during frame transmission, using module 612.

Overall transmission control is performed by module 611 that receives data, SOF, EOF and CRC. A word assembler module 609 is used to assemble incoming words, and a fill word module 610 receives data "words" before sending it to module 611 for transmission. Transmit buffer control is performed by module 614.

Figure 3A:
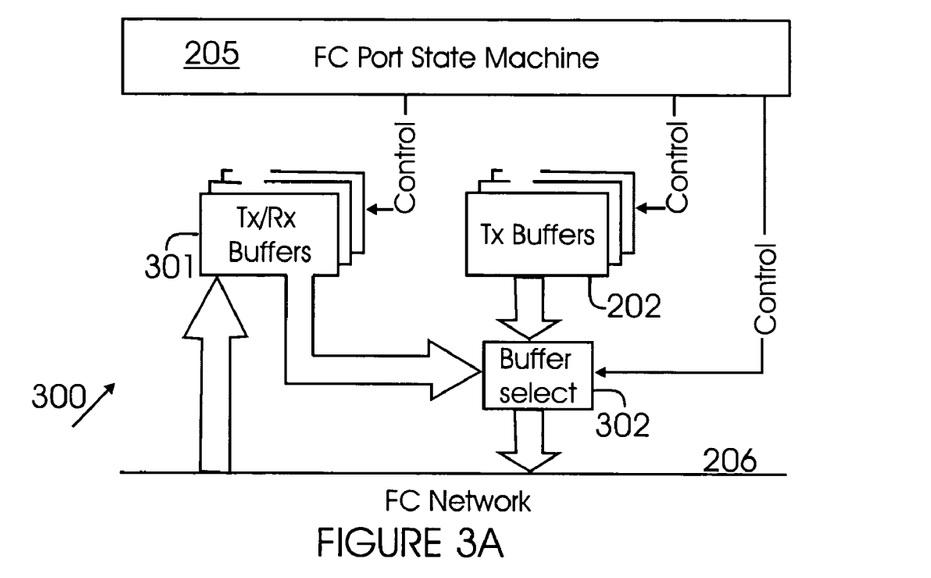
FIGS. 3A/3B show block diagrams of a system for processing RMS frames, according to one aspect of the present invention.

FIG. 3A shows a system that can be used in modules 402 and 403 for processing RMS frames. For incoming-only frames and outgoing-only frames (i.e., the frames that don't need modification), the buffers are still separated to avoid contention during full-duplex operations as shown in FIG. 2A. However, for RMS frames the prior art dual buffer scheme is modified as depicted by buffer scheme 300 in FIG. 3A.

FIG. 3A shows a set of buffers 301 that are controlled by state machine 205. RMS frames (303, FIG. 3B) are received from network 206 and processed in buffers 301. RMS frames 303 are not copied to TX buffers 202 before modification. After the frames are modified in buffers 301, the frames are sent to Tx buffer 202 for transmission. Buffer select logic 302 controls selection of buffers based upon the type of frame, i.e., RMS or non-RMS frames.

The buffer scheme of FIG. 3A allows firmware to accelerate processing of RMS, as follows:

Firmware first detects if a Receive-Modify-Send frame has arrived. Viewing incoming frame headers performs this operation. If the incoming frames are RMS type, then system 400A firmware modifies the frame in-place at Rx buffer 301, without copying the frame to another buffer (Tx 202); and after the frames are modified, the frames are transmitted.

Figure 3B:
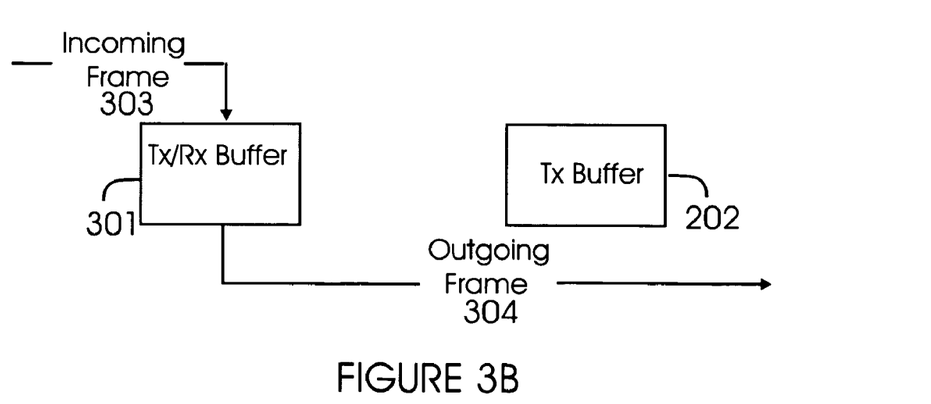

FIG. 3B shows a block diagram for RMS frame flow, according to one aspect of the present invention. Incoming RMS frame 303 is modified in buffer 301 and is then moved to Tx buffer 202. Buffer select module 302 then transmits the modified frame 304 to network 206.

FIG. 5 shows a block diagram of the transmission protocol engine ("TPE") 407. TPE 407 maintains plural counters/registers to interact with drives coupled to ports 405. Each TPE 407 interacts with processor 400 via port manager interface 401.

Each Fibre Channel port of system 400A includes a TPE module for interfacing with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507) receives information from a receiver module 506 that receives decoded data from decode module 504 and parity data from module 505.

Management interface module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

In one aspect of the present invention, extra processing is not required because the frame is not copied from an Rx buffer to a Tx buffer.

Although the present invention has been described with reference to specific embodiments, these embodiments are illustrative only and not limiting. Many other applications and embodiments of the present invention will be apparent in light of this disclosure and the following claims.

What is claimed:

1. A method for processing receive-modify-send ("RMS") frames in a fibre channel network device, comprising:
   receiving a frame in a receive buffer of the network device;
   determining if the received frame is an RMS frame;
   if the received frame is an RMS frame, modifying the RMS frame within the receive buffer and without copying the RMS frame to a transmit buffer; and
   transmitting the modified RMS frame.

2. The method of claim 1, wherein a port state machine controls the receive buffer where RMS frames are modified.

3. The method of claim 1, wherein determining if the received frame is an RMS frame comprises viewing a header of the received frame.

4. The method of claim 1, further comprising buffer select logic of the network device selecting the receive buffer or the transmit buffer for modifying the received frame based upon the determination of whether the received frame is an RMS frame.

5. A fibre channel switch element coupled to a network, the switch element comprising:
   a port having a receive buffer for receiving a frame from the network, and a transmit buffer for transmitting the frame to the network; and
   logic for determining if the frame is a receive-modify-send (RMS) frame;
   wherein if the received frame is an RMS frame, the RMS frame is modified within the receive buffer and without copying the RMS frame to the transmit buffer, and the modified RMS frame is sent for transmission to the network.

6. The switch element of claim 5, wherein buffer select logic of the switch element selects the receive buffer or the transmit buffer for modifying and transmitting frames based upon the determination of whether the received frame is an RMS frame.

7. The switch element of claim 5, wherein determining if the received frame is an RMS frame comprises viewing a header of the received frame.

8. A fibre channel network, comprising:
   a fibre channel switch element including a port having a receive buffer for receiving a frame from the network, and a transmit buffer for transmitting the frame to the network; and
   logic for determining if the frame is a receive-modify-send (RMS) frame;
   wherein if the received frame is an RMS frame, the RMS frame is modified within the receive buffer and without copying the RMS frame to the transmit buffer, and the modified RMS frame is sent for transmission to the network.

9. The network of claim 8, wherein buffer select logic of the switch element selects the receive buffer or the transmit buffer for modifying and transmitting frames based upon the determination of whether the received frame is an RMS frame.

10. The network of claim 8, wherein determining if the received frame is an RMS frame comprises viewing a header of the received frame.

* * * * *

UNITED STATES PATENT AND TRADEMARK OFFICE
CERTIFICATE OF CORRECTION

PATENT NO. : 7,620,059 B2 Page 1 of 1
APPLICATION NO. : 10/889256
DATED : November 17, 2009
INVENTOR(S) : Fike et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1484 days.

Signed and Sealed this

Twenty-sixth Day of October, 2010

David J. Kappos
*Director of the United States Patent and Trademark Office*